United States Patent
Walker et al.

(10) Patent No.: US 10,001,263 B2
(45) Date of Patent: Jun. 19, 2018

(54) FABRIC WITH EMBEDDED LIGHT EMITTING DIODES (LED)

(71) Applicant: REVELLA, LLC, Maitland, FL (US)

(72) Inventors: Lisa Walker, Maitland, FL (US); Wayne Nassis, Jr., Winter Park, FL (US)

(73) Assignee: REVELLA, LLC, Maitland, FL (US)

( * ) Notice: Subject to any disclaimer, the term of this patent is extended or adjusted under 35 U.S.C. 154(b) by 2 days.

(21) Appl. No.: 15/391,468

(22) Filed: Dec. 27, 2016

(65) Prior Publication Data

US 2017/0184287 A1    Jun. 29, 2017

Related U.S. Application Data

(60) Provisional application No. 62/272,373, filed on Dec. 29, 2015.

(51) Int. Cl.
| | | |
|---|---|---|
| F21V 21/08 | (2006.01) | |
| H05B 37/02 | (2006.01) | |
| F21V 33/00 | (2006.01) | |
| H05B 33/08 | (2006.01) | |
| F21V 23/04 | (2006.01) | |
| F21V 23/00 | (2015.01) | |
| F21L 4/02 | (2006.01) | |
| A47K 10/02 | (2006.01) | |
| F21Y 115/10 | (2016.01) | |

(52) U.S. Cl.
CPC .......... *F21V 21/0816* (2013.01); *A47K 10/02* (2013.01); *F21L 4/02* (2013.01); *F21V 23/002* (2013.01); *F21V 23/0435* (2013.01); *F21V 33/0004* (2013.01); *H05B 33/0854* (2013.01); *H05B 37/0227* (2013.01); *F21Y 2115/10* (2016.08)

(58) Field of Classification Search
CPC ............. F21V 33/0004; F21V 33/0008; F21V 23/002; F21V 23/0442; D03D 1/0088; D03D 3/00; D03D 3/06; D03D 15/00; A41D 1/005; A41D 27/08; A41D 27/085; H05B 37/0227; H05B 33/0854; Y10S 362/80; Y10S 362/806; Y01T 442/30; F21Y 2115/10; A47K 10/02
See application file for complete search history.

(56) References Cited

U.S. PATENT DOCUMENTS

| | | |
|---|---|---|
| 4,599,682 A | 7/1986 | Stephens |
| 5,455,749 A | 10/1995 | Ferber |

(Continued)

*Primary Examiner* — Haissa Philogene
(74) *Attorney, Agent, or Firm* — Cian G. O'Brien; Beusse, Wolter, Sanks & Maire PLLC

(57) ABSTRACT

An apparatus is provided that includes a piece of fabric with a slot formed in the piece of fabric. The apparatus includes light emitting diodes (LEDs) positioned within the slot. The apparatus also includes a button operatively coupled to the LEDs such that the LEDs are configured to illuminate upon depression of the button. An apparatus is also provided that includes the piece of fabric with the slot formed in the piece of fabric and LEDs within the slot. The apparatus also includes a motion sensor to measure a motion parameter of the piece of fabric. The motion sensor is operatively coupled to the LEDs such that the LEDs are illuminated when the motion parameter exceeds a motion threshold.

18 Claims, 8 Drawing Sheets

(56) References Cited

U.S. PATENT DOCUMENTS

| | | | |
|---|---|---|---|
| 7,592,276 B2* | 9/2009 | Hill | D02G 3/441 |
| | | | 313/511 |
| 9,003,569 B2* | 4/2015 | Ramirez | A41D 19/01547 |
| | | | 2/161.1 |
| 9,320,946 B2* | 4/2016 | Bothwell | A63B 49/02 |
| 9,656,139 B2* | 5/2017 | Stanley | A63B 69/0002 |
| 2004/0009729 A1 | 1/2004 | Hill et al. | |
| 2013/0106289 A1* | 5/2013 | Beneski | H05B 33/0803 |
| | | | 315/121 |

* cited by examiner

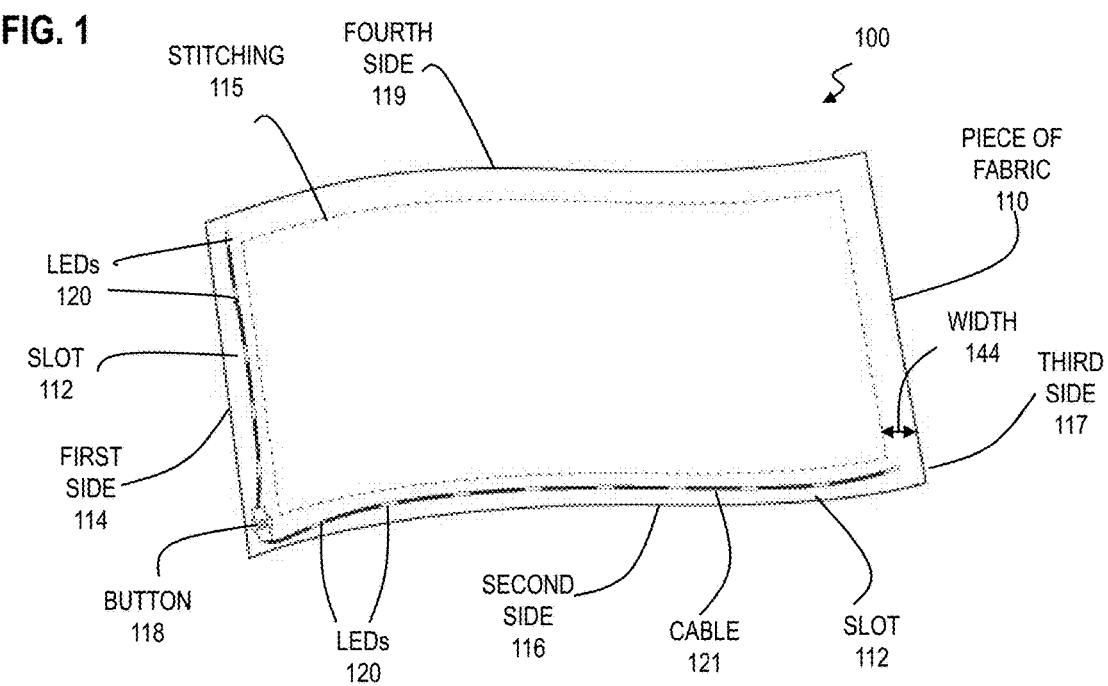

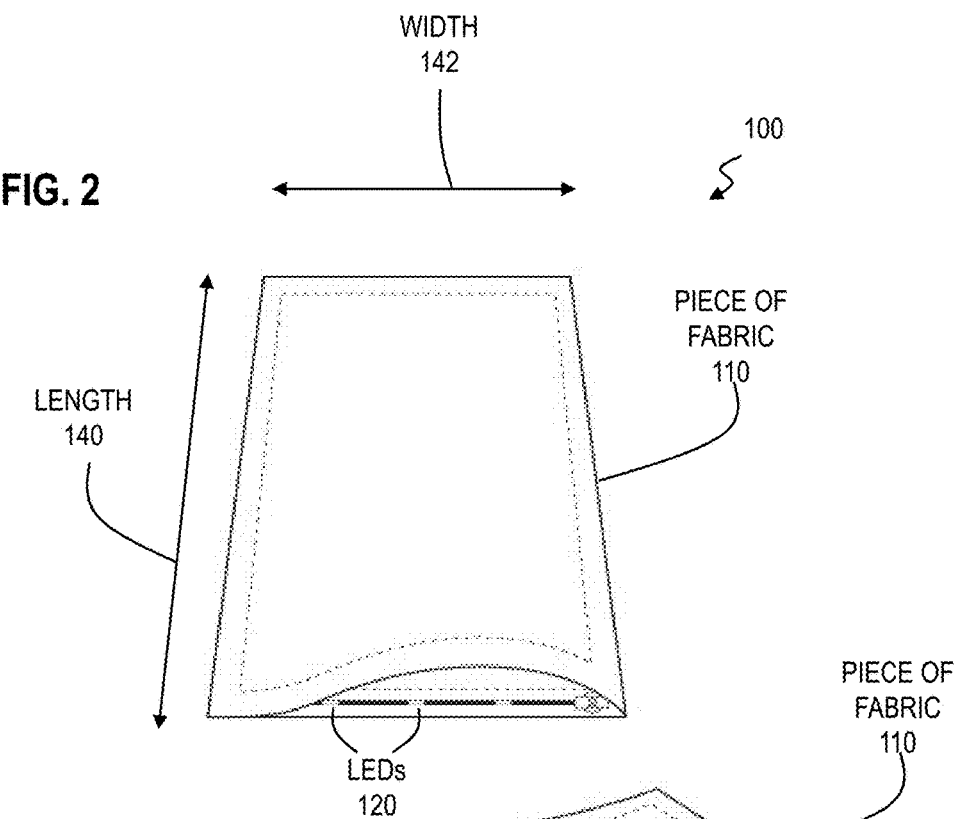
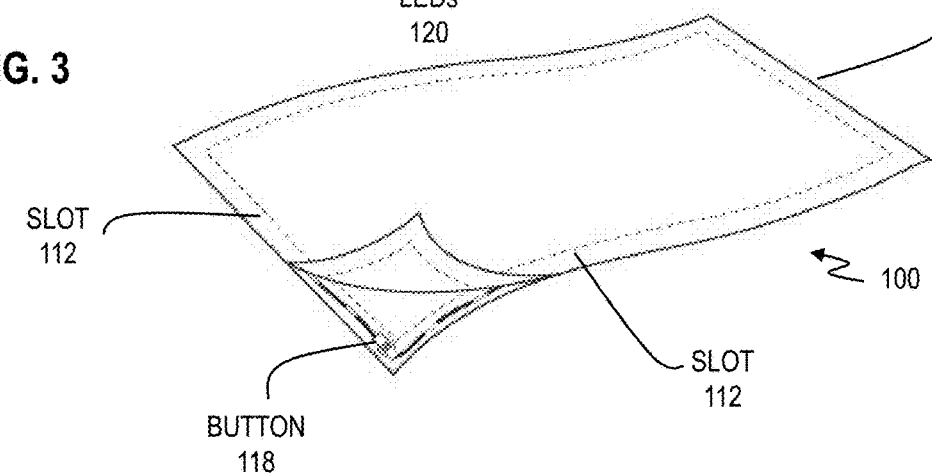

FABRIC WITH EMBEDDED LIGHT EMITTING DIODES (LED)

CROSS REFERENCE TO RELATED APPLICATIONS

This application claims benefit of Provisional Appln. No. 62/723,373, filed Dec. 29, 2015, the entire contents of which are hereby incorporated by reference as if fully set forth herein, under 35 U.S.C. § 119(e).

BACKGROUND OF THE INVENTION

Light Emitting Diodes (LED) are commonly used with fabrics, and have been embedded within fabric, such as a towel, after which the LEDs illuminate the fabric, for decorative and aesthetic purposes. However, there are several drawbacks to conventional fabric designs with embedded LEDs. For example, the placement of the LEDs within conventional fabric is not conducive to a user holding the fabric. In another example, conventional fabric designs with embedded LEDs typically feature a manual switch that merely turns the LEDs on or off in one operational mode, without any further options.

BRIEF DESCRIPTION OF THE INVENTION

One embodiment of the present invention is an apparatus that includes a piece of fabric with a slot formed in the piece of fabric. The apparatus also includes light emitting diodes (LEDs) positioned within the slot. The apparatus also includes a button operatively coupled to the LEDs such that the LEDs are configured to illuminate upon depression of the button.

Another embodiment of the present invention is an apparatus that includes a piece of fabric with a slot formed in the piece of fabric. The apparatus also includes light emitting diodes (LEDs) positioned within the slot. The apparatus also includes a motion sensor to measure a motion parameter of the piece of fabric. The motion sensor is operatively coupled to the LEDs such that the LEDs are illuminated when the motion parameter exceeds a motion threshold.

BRIEF DESCRIPTION OF THE DRAWINGS

FIG. 1 is a top cut-away view of an apparatus including a piece of fabric and LEDs in accordance with aspects of embodiments of the invention.

FIG. 2 is a top cut-away view of the apparatus of FIG. 1.

FIG. 3 is a top cut-away view of the apparatus of FIG. 1.

DETAILED DESCRIPTION OF THE INVENTION

Figure 4B:
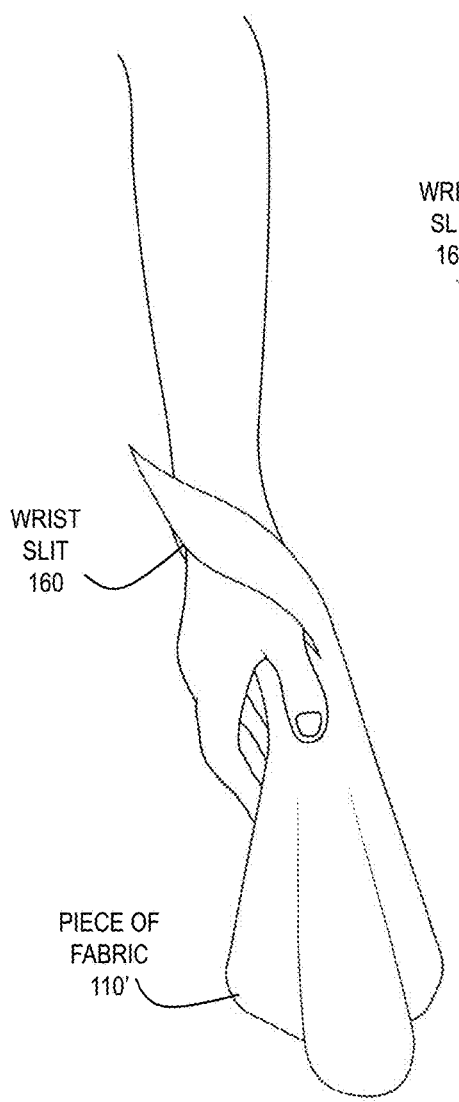
FIG. 4B is a perspective view of the piece of fabric of FIG. 4A secured around a wrist of a user in accordance with aspects of embodiments of the invention.

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained.

FIGS. 1-3 are top cut-away views of an apparatus 100 including a piece of fabric 110 and LEDs 120 in accordance with aspects of embodiments of the invention. In one embodiment, the piece of fabric 110 is a towel with a length 140 of approximately 18 inches or within a range of 15-20 inches and a width 142 of approximately 15 inches or within a range of 12-18 inches. In another embodiment, the piece of fabric 110 is a towel with a length 140 of approximately 24 inches or within a range of 22-26 inches and a width 142 of approximately 18 inches or within a range of 15-20 inches. In another embodiment, the piece of fabric 110 is a bandana with a length 140 of approximately 22 inches or within a range of 20-24 inches and a width 142 of approximately 22 inches or within a range of 20-24 inches. The above numerical dimensions and ranges are merely exemplary and the piece of fabric 110 is not limited to any specific numerical dimension or range. Although FIGS. 1-3 depict that the piece of fabric 110 is rectangular, the piece of fabric 110 is not limited to this shape and may be square, circular, oval, triangle or any polygon shape appreciated by one skilled in the art.

In some embodiments, the piece of fabric 110 is made from any textile, cloth or flexible woven material including but not limited to cotton and/or polyester. In some embodiments, textile includes any flexible material consisting of a network of natural or artificial fibers (e.g. yarn or thread). Yarn is produced by spinning raw fibers of wool, flax, cotton or other material to produce long strands. In some embodiments, textile material used to form the piece of fabric 110 is formed by weaving, knitting, crocheting, knotting or felting. In an embodiment, the piece of fabric 110 is made from any fabric material, including fabrics that are woven, non-woven as well as knitted fabrics and netted fabrics and technical fabrics (such as Gore-Tex® and Gannex®). In one embodiment, the piece of fabric 110 is made from natural fabrics or synthetic fabrics. In some embodiments, the piece of fabric 110 is not limited to natural material (e.g. cloth) and includes synthetic materials such as translucent plastic material. In some embodiments, the piece of fabric 110 is translucent and one or more characteristics of the piece of fabric 110 is selected so that the fabric 110 is translucent. These characteristics include but are not limited to color, weave spacing and thickness.

As illustrated in FIGS. 1-3, a slot 112 is formed along four sides 114, 116, 117, 119 of the piece of fabric 110. In one embodiment, the slot 112 is formed by folding the four sides 114, 116, 117, 119 inwardly and applying stitching 115 that runs approximately parallel to the four sides 114, 116, 117, 119. A width 144 of the slot 112, defined between the stitching 115 and the edge of the respective sides 114, 116, 117, 119 is approximately 1 inch or within a range of 0.5-2 inches. Although FIGS. 1-3 depict the slot 112 formed continuously along the four sides 114, 116, 117, 119, the slot 112 need not be formed along the four sides 114, 116, 117, 119 and may be formed along less than the four sides 114, 116, 117, 119. In other embodiments, the slot 112 does not extend over one of the sides 114, 116, 117, 119 and instead extends over an interior area of the fabric 110. In an example embodiment, the slot 112 extends from a first corner of the fabric 110 (e.g. junction of the first side 114 and second side 116) to an opposite corner of the fabric 110 (e.g. junction of the third side 117 and fourth side 119). In other embodiments, the slot 112 is not formed with stitching 115 and instead can be formed with an adhesive or Velcro® after folding the fabric 110 along the one or more sides 114, 116, 117, 119.

As further illustrated in FIGS. 1-3, LEDs 120 are positioned within the slot 112 over the first side 114 and the second side 116. The LEDs 120 are electrically connected by a cable 121 that extends between the LEDs 120 within the slot 112. In one embodiment, the cable 121 has a continuous length within the slot 112 of approximately 36 inches or within a range of 30-40 inches. In another embodiment, the LEDs 120 are spaced apart by a fixed separation along the cable 121. In an example embodiment, the LEDs 120 are spaced by approximately 3.5 inches or within a range of 2-5 inches, for example. The above numerical dimensions and ranges are merely exemplary and the length of the cable 121 as well as the spacing of the LEDs 120 is not limited to any specific dimension or numerical range. In some embodiments, the length of the cable 121 is based on the collective length of the slot 112 through which the cable 121 is extended. In an example embodiment, if the cable 121 is extended through the slot 112 over the first side 114 and second side 116, the length of the cable 121 is based on the collective length of the slot 112 over the first side 114 and second side 116. Although LEDs are depicted in FIG. 1, the apparatus 100 is not limited to LEDs and encompasses any lighting device that can be positioned within the slot 112 over the one or more sides of the fabric 110.

As shown in FIG. 1, since the LEDs 120 are not positioned within the slot 112 over the third side 117 and fourth side 119, this advantageously permits the third side 117 and/or the fourth side 119 to be used for other purposes, such as holding the piece of fabric 110, for example. Although FIGS. 1-3 depict the LEDs 120 positioned in the slot 112 over the first side 114 and the second side 116, the LEDs 120 need not be positioned within the slot 112 over the first and second sides 114, 116 and instead may be positioned in the slot 112 over any one of the sides 114, 116, 117, 119 and/or in the slot 112 over a portion of one of the sides 114, 116, 117, 119. In an embodiment, the LEDs 120 are a linear array of LEDs and/or LED strip lights. In an example embodiment, the LEDs 120 comprise SS1 RGB Soft Strip system provided by Edge Lighting, 1718 W. Fullerton Avenue, Chicago Ill. 60614. In another embodiments, the LEDs 120 are wireless LEDs that are positioned within the slot 112 and are not electrically connected by the cable 121. In some embodiments, the wireless LEDs would be sewn inside the slot 112 or placed inside of a custom slot and then sewn or attached to the custom slot.

As further illustrated in FIGS. 1-3, a button 118 is operatively coupled to the LEDs 120 by the cable 121 such that the LEDs 120 illuminate upon depression of the button 118. In one embodiment, the LEDs 120 illuminate in a static mode (i.e. LEDs 120 stay on) upon a first depression of the button 118 and the LEDs 120 illuminate in a flashing mode (i.e. LEDs 120 flash on and off) upon a second depression of the button 118. In another embodiment, the LEDs 120 illuminate in the flashing mode upon the first depression of the button 118 and the LEDs 120 illuminate in the static mode upon the second depression of the button 118. In yet another embodiment, the LEDs 120 illuminate in a first flashing mode (i.e. LEDs flash at a first rate) upon the first depression of the button 118 and the LEDs 120 illuminate in a second flashing mode (i.e. LEDs flash at a second rate different than the first rate) upon the second depression of the button 118. In an example embodiment, the second rate is greater than the first rate. In another example embodiment, the second rate is lower than the first rate. In these embodiments, depression of the button 118 cycles the LEDs 120 through one or more static and/or flashing modes, after which a depression of the button 118 deactivates the LEDs 120. Subsequent depression of the button 118 recycles the LEDs 120 through the one or more static and/or flashing modes.

In another embodiment, the LEDs 120 illuminate in a first color upon a first depression of the button 118 and the LEDs 120 illuminate in a second color different than the first color upon a second depression of the button 118. In this embodiment, depression of the button 118 cycles the LEDs 120 through a plurality of different colors, after which a depression of the button 118 deactivates the LEDs 120. Subsequent depression of the button 118 recycles the LEDs 120 through the plurality of different colors.

In another embodiment, upon depression the button 118, each LED 120 is illuminated at a first color during a first time period and a second color other than the first color during a second time period after the first time period. In an example embodiment, upon depression of the button 118, a first LED 120 is illuminated at a first color and a second LED 120 is illuminated at a second color different than the first color during a first time period and the first LED 120 is illuminated at the second color and the second LED 120 is illuminated at the first color during a second time period after the first time period. In an example embodiment, the time period is approximately 1 second or within a range of 0.5-2 seconds. However, the LEDs 120 need not have different colors during each respective time period.

Although FIGS. 1-3 depict the piece of fabric 110 where the LEDs 120 are positioned within the slot 112 along the first and second sides 114, 116 of the piece of fabric 110, in other embodiments the LEDs 120 extend within the slot 112 along three continuous sides 114, 116, 117 of the fabric 110. In one embodiment, the LEDs 120 extend within the slot 112 over the sides 114, 116 and a portion of the third side 117. In another embodiment, the LEDs 120 extend within the slot 112 over the sides 114, 116 and the entire third side 117. In these embodiments, since the LEDs 120 are not positioned within the slot 112 over the fourth side 119, this advantageously permits the fourth side 119 to be used for other purposes, such as holding the piece of fabric 110, for example.

Figure 4A:
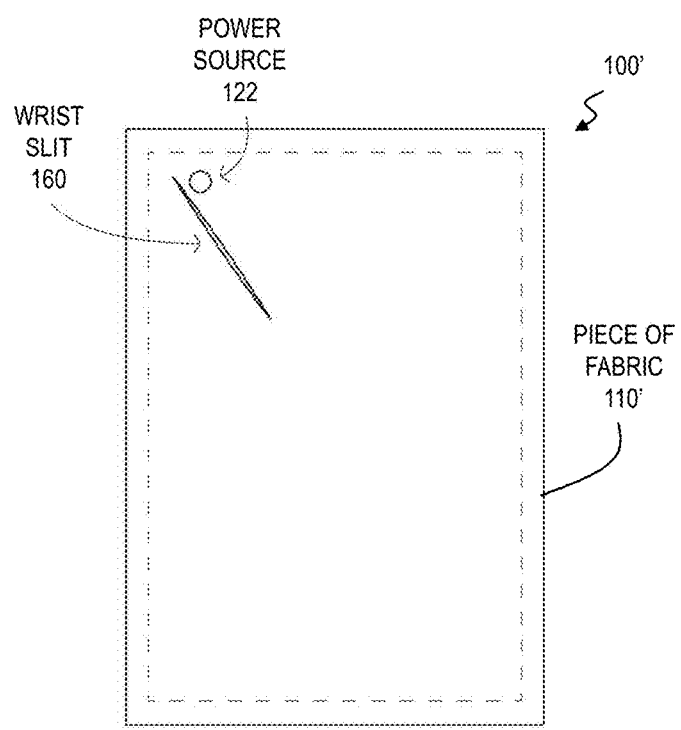
FIG. 4A is a top cut-away view of an apparatus including a piece of fabric with a wrist slit in accordance with aspects of embodiments of the invention.

FIG. 4A is a top cut-away view of an apparatus 100' including a piece of fabric 110' with a wrist slit 160 and LEDs in accordance with aspects of embodiments of the invention. The piece of fabric 110' is similar to the piece of fabric 110 discussed above, with the exception of the features discussed herein. The wrist slit 160 is formed in the piece of fabric 110'. In one embodiment, the wrist slit 160 is formed adjacent a corner of the piece of fabric 110'. In an example embodiment, the wrist slit 160 is formed adjacent the corner of the piece of fabric 110' defined by a junction of the third side 117 and fourth side 119. In an example embodiment, the wrist slit 160 is oriented from a first corner (e.g. junction of sides 117, 119) to an opposite corner (e.g. junction of sides 114, 116) of the piece of fabric 110'. In an example embodiment, the wrist slit 160 has a length within a range of 4-6 inches such as 5 inches. FIG. 4B is a perspective view of the piece of fabric 110' of FIG. 4A secured around a wrist of a user in accordance with aspects of embodiments of the invention. To secure the piece of fabric 110' around the wrist, the user passes his or her hand through the slit 160 such that the piece of fabric 110' encircles the wrist of the user. This advantageously secures the piece of fabric 110' to the wrist of the user, such as when the user swings the piece of fabric 110'.

Figure 4D:
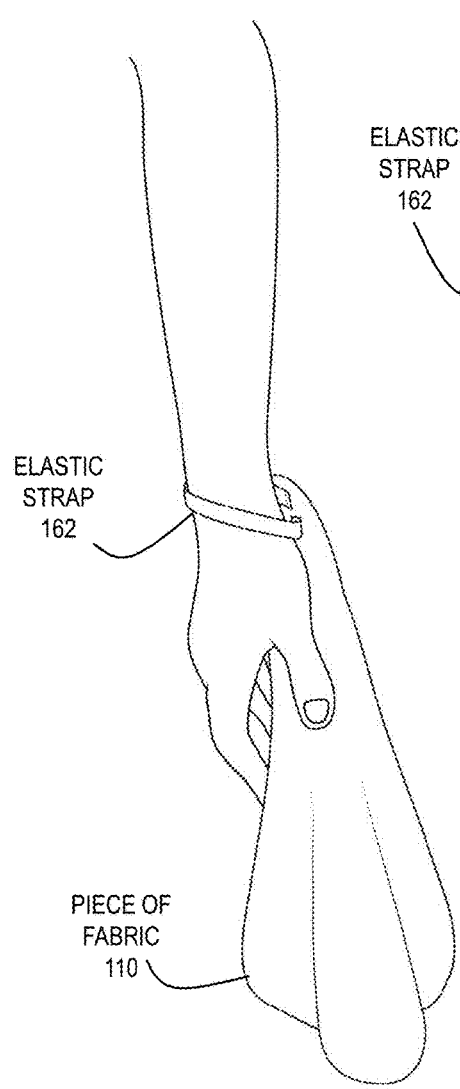
FIG. 4D is a perspective view of the piece of fabric of FIG. 4C secured around a wrist of a user in accordance with aspects of embodiments of the invention.
Figure 4C:
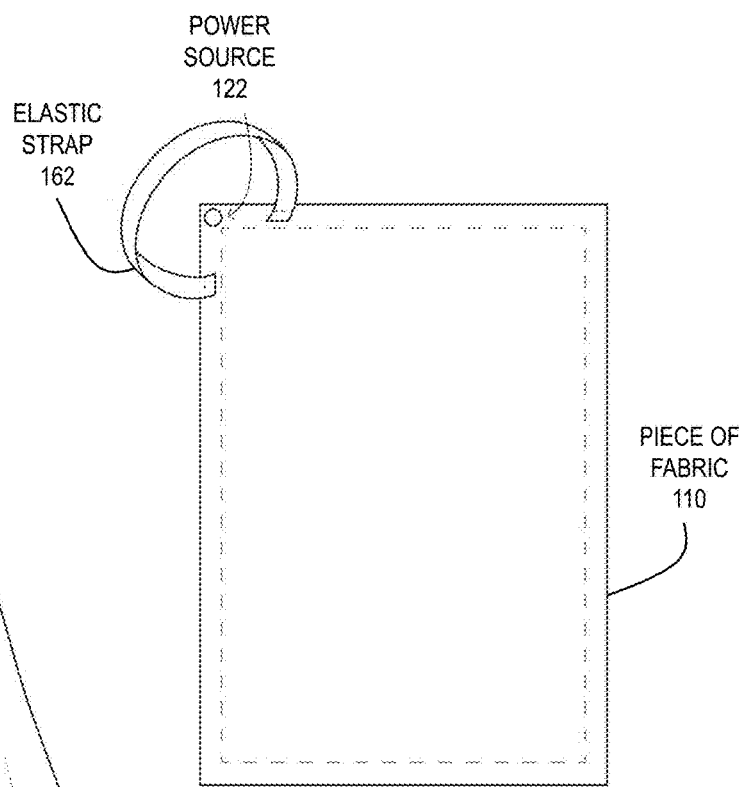
FIG. 4C is a top cut-away view of an apparatus including a piece of fabric with an elastic strap in accordance with aspects of embodiments of the invention.

In other embodiments, a wrist strap is attached to the piece of fabric (e.g. at a corner of the piece of fabric) and the wrist of the user is secured to the piece of fabric using the wrist strap. Any wrist strap appreciated by one of ordinary skill in the art could be used. FIG. 4C is a top cut-away view of an apparatus including the piece of fabric 110 with an elastic strap 162 and LEDs in accordance with aspects of embodiments of the invention. The elastic band 162 is attached to the piece of fabric 110 adjacent to a corner of the piece of fabric 110. In some embodiments, opposite ends of the elastic band 162 are sewn or woven into the piece of fabric 110. In other embodiments, the elastic band 162 is attached to the piece of fabric 110 using any adhesive appreciated by one skilled in the art. In still other embodiments, the elastic band 162 is attached to the piece of fabric 110 by passing the elastic band 162 through an opening in the piece of fabric 162 and forming a knot in the elastic band 162. FIG. 4D is a perspective view of the piece of fabric 110 of FIG. 4C secured around a wrist of a user with the elastic band 162 in accordance with aspects of embodiments of the invention.

Figure 5:
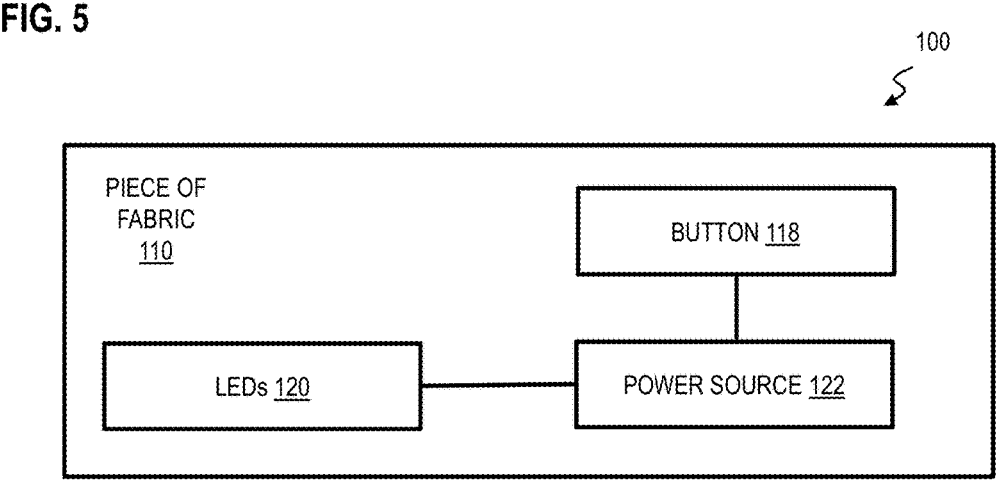
FIG. 5 is a schematic diagram of the apparatus of FIG. 1.

FIG. 5 is a schematic diagram of the apparatus 100 of FIG. 1. The apparatus 100 includes a power source 122 connected to the button 118 to receive a signal upon depression of the button 118. The power source 122 is connected to the LEDs 120 to transmit a signal to the LEDs 120 to illuminate the LEDs 120 upon receiving the signal from the button 118. In an example embodiment, where the LEDs 120 are wireless, the button 118 wirelessly transmits a signal to a respective power source integral with each LED to illuminate each LED. In an example embodiment, the power source 122 is one or more 3 Volt Lithium batteries, such as CR2032 or CR2016. In the previously-discussed embodiment, the power source 122 transmits a static signal to the LEDs 120 to illuminate the LEDs 120 in the static mode upon a first depression of the button 118 and the power source 122 transmits an alternating signal (AC or DC) to the LEDs 120 to illuminate the LEDs 120 in the flashing mode upon the second depression of the button 118. In another previously-discussed embodiment, the power source 122 transmits a first signal to the LEDs 120 to illuminate the LEDs 120 in the first color upon the first depression of the button 118 and transmits a second signal to the LEDs 120 to illuminate the LEDs 120 in the second color upon the second depression of the button 118. In another previously-discussed embodiment, upon depression of the button 118, during the first time period the power source 122 transmits a signal to the first LED 120 to illuminate the first LED 120 at the first color and transmits a signal to the second LED 120 to illuminate the second LED 120 at the second color. Subsequently, during the second time period, the power source 122 transmits a signal to the first LED 120 to illuminate the first LED 120 at the second color and transmits a signal to the second LED 120 to illuminate the second LED 120 at the first color.

Figure 6:
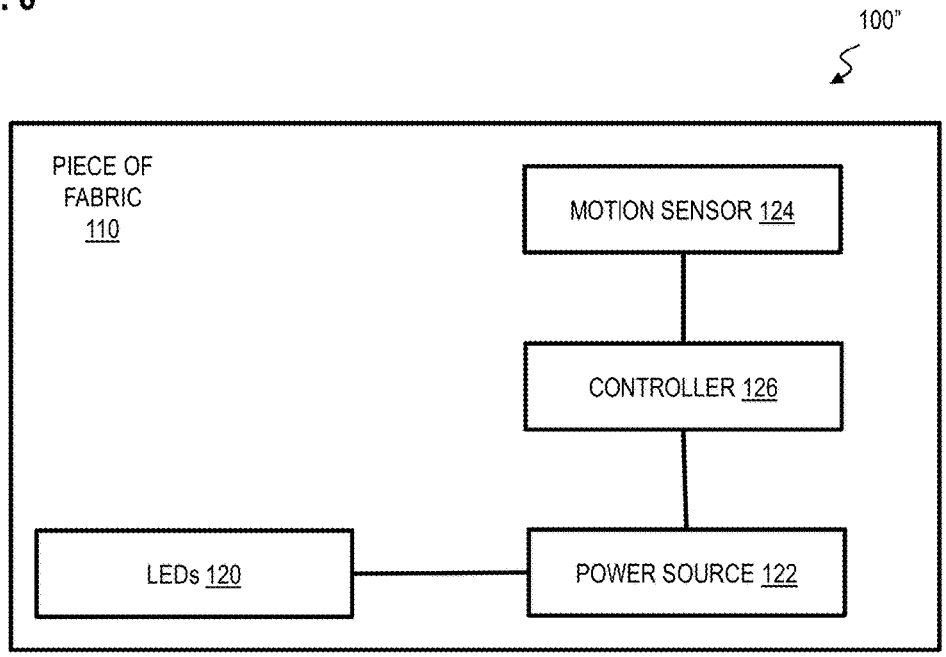
FIG. 6 is a schematic diagram of an apparatus including a piece of fabric and LEDs in accordance with aspects of embodiments of the invention.

FIG. 6 is a schematic diagram of an apparatus 100" including the piece of fabric 110 and LEDs 120 in accordance with aspects of embodiments of the invention. As with the piece of fabric 110 of FIGS. 1-3, the LEDs 120 are positioned within the slot 112 of the piece of fabric 110. The apparatus 100" also includes a motion sensor 124 to measure a motion parameter of the piece of fabric 110. As depicted in FIG. 6, a controller 126 is connected to the motion sensor 124, such that the controller 126 receives the measured motion parameter from the motion sensor 124, and compares the measured motion parameter with a motion threshold stored in a memory of the controller 126. If the measured motion parameter exceeds the motion threshold, the controller 126 sends a signal to the power source 122, such that the power source 122 in turn transmits a signal to the LEDs 120 to illuminate the LEDs 120.

In one embodiment, the motion sensor 124 is an accelerometer that measures a magnitude of an acceleration of the piece of fabric 110. In an example embodiment, the motion sensor 124 is an accelerometer that measures a magnitude of a centrifugal acceleration of the piece of fabric 110, when the piece of fabric 110 is moved in a circular or approximately circular path of travel. As previously discussed, the controller 126 compares the measured acceleration with an acceleration threshold. In one embodiment, the acceleration threshold can be calculated, based on one or more parameters of the piece of fabric 110, as discussed below.

Figure 7:
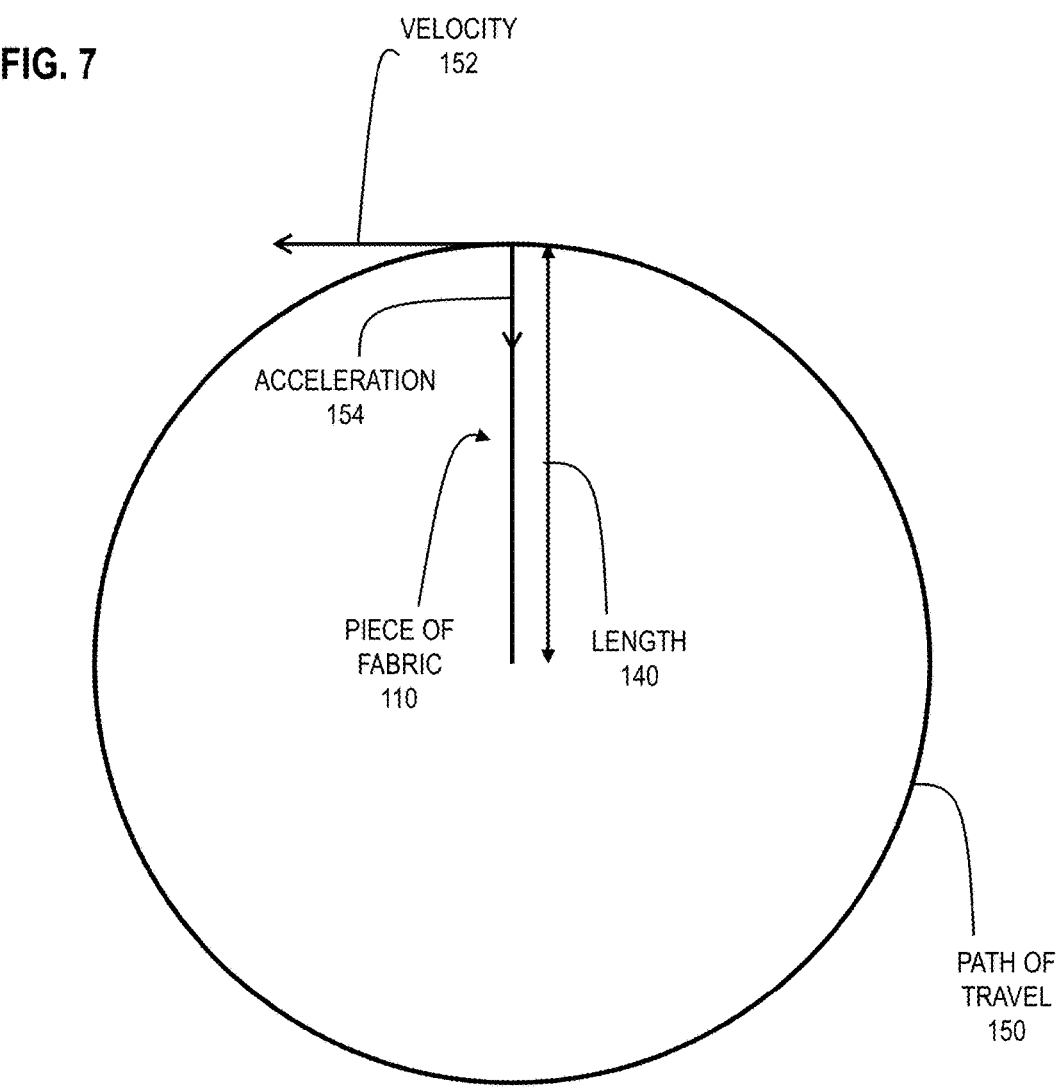
FIG. 7 is a schematic diagram of a path of travel of the apparatus of FIG. 6.

FIG. 7 is a schematic diagram of a path of travel 150 of the piece of fabric 110 of FIG. 6. In one embodiment, the path of travel 150 is circular or approximately circular such that a velocity 152 of the piece of fabric 110 is oriented tangent to the path of travel 150 and a centrifugal acceleration 154 is oriented orthogonal to the path of travel 150. As appreciated by one skilled in the art, the magnitude of the centrifugal acceleration 154 is given by:

$$a = \frac{v^2}{l} \tag{1}$$

where a is the magnitude of the centrifugal acceleration 154, v is the magnitude of the velocity 152 and l is the length 140 of the piece of fabric 110. In an example embodiment, the length 140 is 18 inches. The magnitude of the velocity 152 can be determined by:

$$v = \omega * 2\pi * l \tag{2}$$

where v is the magnitude of the velocity 152, w is the number of revolutions per second of the piece of fabric 110 and l is the length 140. In one embodiment, where the length 140 is 18 inches, and the piece of fabric 110 revolves at 1 revolution per second, equation (2) provides that the magnitude of the velocity 152 is approximately 113 inches/second and equation (1) provides that the magnitude of the acceleration 154 is approximately 710 inches/second$^2$ or 18 meters/second$^2$. In this embodiment, the motion threshold stored in the controller 126 is set to approximately 18 meters/second$^2$. However, the motion threshold can be adjusted to any acceleration threshold, which is generated using equations (1) and (2) with one or more parameters of the piece of fabric 110, including the length 140 and the number of revolutions per second of the piece of fabric 110.

In this example embodiment, equations (1)-(2) are used to initially calculate the acceleration threshold which is then stored in the memory of the controller 126. During operation, the motion sensor 124 measures the magnitude of the acceleration 154 of the piece of fabric 110 as it travels along the path of travel 150. The motion sensor 124 then transmits the measured acceleration to the controller 126, which compares the measured acceleration with the acceleration threshold. If the measured acceleration received by the controller 126 exceeds the acceleration threshold, the controller 126 transmits a signal to the power source 122, such that the power source 122 subsequently transmits a signal to illuminate the LEDs 120. At a later time, if the measured acceleration received by the controller 126 no longer exceeds the acceleration threshold, the controller 126 transmits a signal to the power source 122, to turn off the LEDs 120.

In one embodiment, the LEDs 120 illuminate in the static mode upon the motion parameter exceeding a first motion threshold and the LEDs 120 illuminate in the flashing mode upon the motion parameter exceeding a second motion threshold greater than the first motion threshold. In an example embodiment, the LEDs 120 illuminate in the static mode upon the measured acceleration exceeding a first acceleration threshold and the LEDs 120 illuminate in the flashing mode upon the measured acceleration exceeding a second acceleration threshold greater than the first acceleration threshold. For example the first acceleration threshold may be based on a first number of revolutions of the piece of fabric (e.g. one revolution per second) and generated using equations (1)-(2) whereas the second acceleration threshold may be based on a second number of revolutions of the piece of fabric (e.g. two revolutions per second) and generated using equations (1)-(2).

In one embodiment, the LEDs 120 illuminate in the first color upon the motion parameter exceeding a first motion threshold and the LEDs 120 illuminate in the second color different than the first color upon the motion parameter exceeding a second motion threshold greater than the first motion threshold. In an example embodiment, the LEDs 120 illuminate in the first color upon the measured acceleration exceeding a first acceleration threshold and the LEDs 120 illuminate in the second color upon the measured acceleration exceeding a second acceleration threshold greater than the first acceleration threshold. For example the first acceleration threshold may be based on a first number of revolutions of the piece of fabric (e.g. one revolution per second) and generated using equations (1)-(2) whereas the second acceleration threshold may be based on a second number of revolutions of the piece of fabric (e.g. two revolutions per second) and generated using equations (1)-(2).

Figure 8:
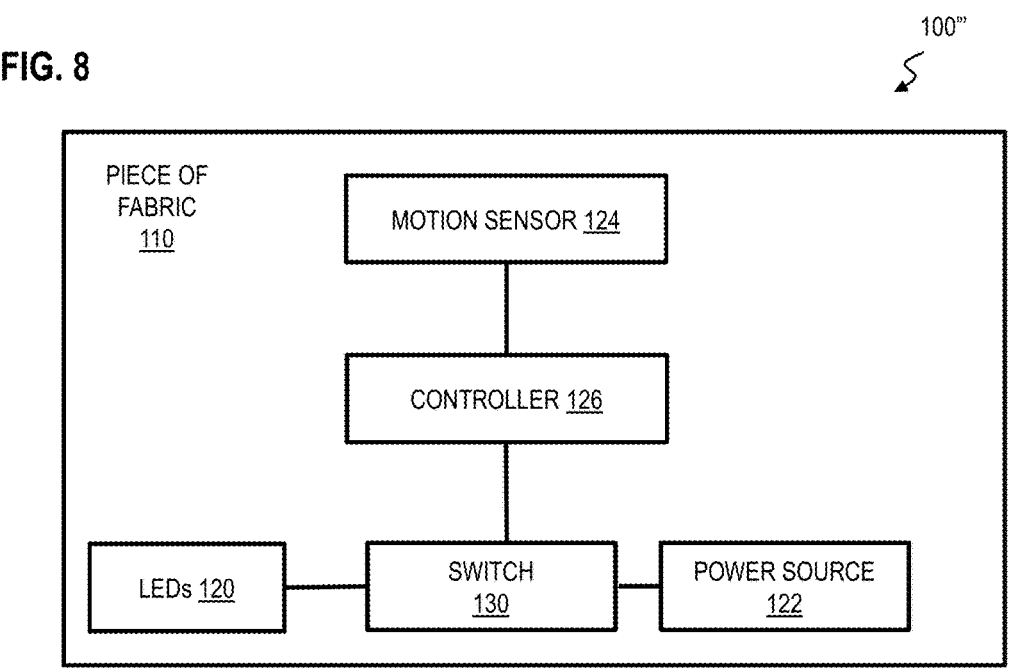
FIG. 8 is a schematic diagram of an apparatus including a piece of fabric and LEDs in accordance with aspects of embodiments of the invention.

FIG. 8 is a schematic diagram of an apparatus 100''' including the piece of fabric 110 and LEDs 120 in accordance with aspects of embodiments of the invention. As with the piece of fabric 110 of FIGS. 1-3, the LEDs 120 are positioned within the slot 112 of the piece of fabric 110. The apparatus 100''' also includes a switch 130 with a first side connected to the LEDs 120 and a second side connected to the power source 122. The switch 130 has an off position which electrically disconnects the LEDs 120 from the power source 122 and an on position that electrically connects the LEDs 120 to the power source 122 such that the power source 122 transmits a signal to the LEDs 120 to illuminate the LEDs 120. The apparatus 100''' includes a motion sensor 124 and controller 126 similar to the motion sensor 124 and controller 126 of FIG. 6. The controller 126 receives the motion parameter from the motion sensor 124 and compares the motion parameter with the motion threshold stored in a memory of the controller 126, as with the controller 126 of FIG. 6. Upon determining that the motion parameter exceeds the motion threshold, the controller 126 transmits a signal to the switch 130 to turn the switch 130 to the on position, such that the power source 122 is electrically connected to the LEDs 120 to illuminate the LEDs 120. In some embodiments, upon determining that the motion parameter no longer exceeds the motion threshold, the controller 126 transmits a signal to the switch 130 to turn the switch 130 to the off position, so that the power source 122 is electrically disconnected from the LEDs 120 to turn off the LEDs 120.

Figure 9A:
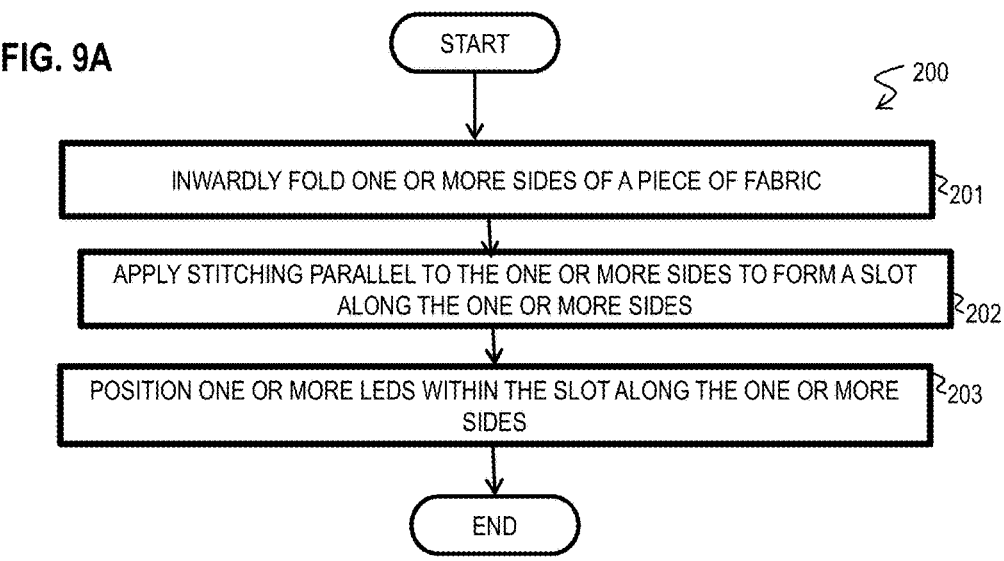
FIG. 9A is a flow chart depicting a method for assembling the apparatus of FIG. 1 in accordance with aspects of embodiments of the invention.

FIG. 9A is a flow chart depicting a method 200 for assembling the apparatus 100 of FIG. 1 in accordance with aspects of embodiments of the invention. In step 201, one or more sides 114, 116, 117, 119 of the piece of fabric 110 are folded inward. In an example embodiment, the one or more sides 114, 116, 117, 119 are folded inward by a distance in a range of 0.5-2 inches. In some embodiments, all four sides 114, 116, 117, 119 of the piece of fabric 110 are folded inward. In other embodiments, less than all four sides 114, 116, 117, 119 of the piece of fabric 110 are folded inward.

In step 202, stitching 115 is applied along the one or more inwardly folded sides 114, 116, 117, 119 of step 201. In one embodiment, the stitching 115 is applied in a direction that is approximately parallel to each of the inwardly folded sides 114, 116, 117, 119. However, the stitching 115 need not be applied in an approximate parallel direction to each of the inwardly folded sides 114, 116, 117, 119. Upon applying the stitching 115, the slot 112 is formed along the inwardly folded sides 114, 116, 117, 119.

In step 203, one or more LEDs 120 are positioned in the slot 112 formed in step 202. In some embodiments, the LEDs 120 are electrically connected by the cable 121 and are operatively coupled to the button 118. In other embodiments, the LEDs 120 are electrically connected by the cable 121 and are operatively coupled to the motion sensor 124 and controller 126 (FIG. 6). In still other embodiments, the LEDs 120 are wirelessly connected to the button 118 and each include an integral power source that receive a wireless signal from the button 118 to illuminate each respective LED 120.

Figure 9B:
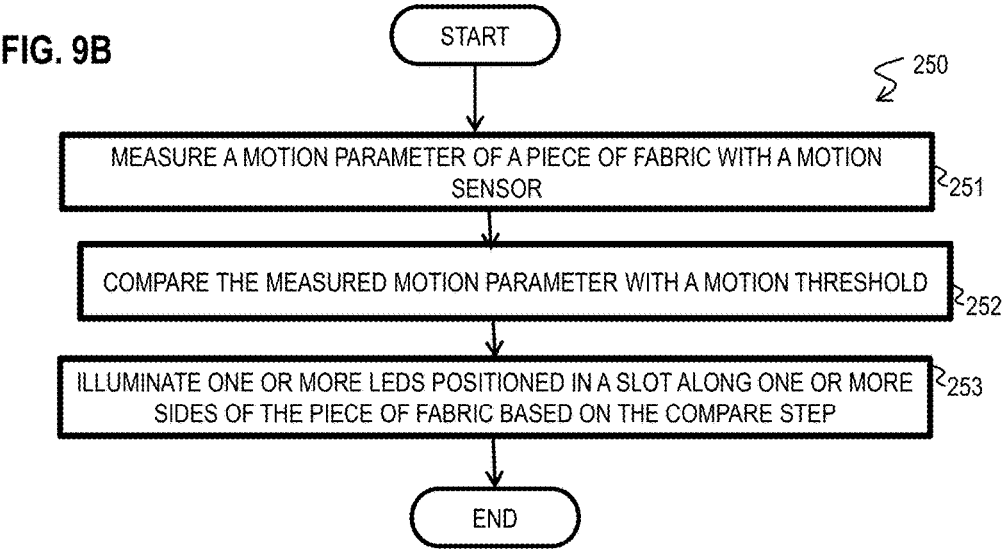
FIG. 9B is a flow chart depicting a method for using the apparatus of FIG. 6 in accordance with aspects of embodiments of the invention.

FIG. 9B is a flow chart depicting a method 250 for using the apparatus 100'' of FIG. 6 in accordance with aspects of embodiments of the invention. In step 251, a motion parameter (e.g. acceleration) of the piece of fabric 110 is measured with the motion sensor 124. In some embodiments, the motion parameter is measured at motion sensor 124 increment time intervals appreciated by one skilled in the art. In some embodiments, the motion parameter is centrifugal acceleration.

In step 252, the measured motion parameter from step 251 is compared with a motion threshold stored in the memory of the controller 126. In some embodiments, the motion threshold is a centrifugal acceleration threshold and computed using Equations 1-2. In other embodiments, the motion threshold is an angular velocity threshold. In still other embodiments, the motion threshold is a linear velocity threshold or linear acceleration threshold. In some embodiments, in step 251 the controller 126 determines whether the measured motion parameter from step 251 is greater than the motion threshold.

In step 253, the one or more LEDs 120 positioned in the slot 112 of the piece of fabric 110 are illuminated, based on the comparison in step 252. In some embodiments, the one or more LEDs 120 are illuminated if the measured motion parameter is greater than the motion threshold. In one embodiment, the one or more LEDs 120 are subsequently turned off if the measured motion parameter is less than the motion threshold.

While certain embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An apparatus comprising:
a piece of fabric;
a slot formed in the piece of fabric;
at least one light emitting diode (LED) positioned within the slot; and
a button operatively coupled to the at least one LEDs such that the at least one LED is configured to illuminate upon depression of the button;
wherein the at least one LED is configured to illuminate in a first color upon a first depression of the button and wherein the at least one LED is configured to illuminate in a second color different than the first color upon a second depression of the button.

2. The apparatus of claim 1, wherein the piece of fabric is made of a textile material with at least one characteristic such that the piece of fabric is translucent.

3. The apparatus of claim 1, further comprising an elastic band attached to the piece of fabric adjacent to a corner of the piece of fabric, wherein the elastic band is sized to receive a hand of a user and secure around a wrist of the user.

4. The apparatus of claim 1, further comprising a power source connected to the button to receive a signal upon depression of the button, and wherein the power source is connected to the at least one LED to transmit a signal to the at least one LED to illuminate the at least one LED upon receiving the signal from the button.

5. The apparatus of claim 1, further comprising a slit in the piece of fabric, said slit being sized to receive a hand of a user and secure around a wrist of the user.

6. The apparatus of claim 5, wherein the slit is positioned adjacent to a first corner of the piece of fabric and the slit is oriented in a direction from the first corner to a second corner of the piece of fabric that is diagonally opposite from the first corner.

7. The apparatus of claim 1, wherein the slot is formed along a perimeter of at least one side of the piece of fabric.

8. The apparatus of claim 7, wherein the slot extends continuously along the perimeter of at least two continuous sides of the piece of fabric.

9. The apparatus of claim 8, wherein the at least one LED comprises a plurality of LEDs that extend within the slot along the at least two continuous sides of the piece of fabric.

10. The apparatus of claim 1, wherein the at least one LED is a strip comprising a linear array of LEDs.

11. An apparatus comprising:
a piece of fabric;
a slot formed in the piece of fabric;
at least one light emitting diode (LED) positioned within the slot; and
a button operatively coupled to the at least one LEDs such that the at least one LED is configured to illuminate upon depression of the button;
wherein the piece of fabric is rectangular with a length in a range of 15-20 inches and a width in a range of 12-18 inches.

12. An apparatus comprising:
a piece of fabric;
a slot formed in the piece of fabric;
at least one light emitting diode (LED) positioned within the slot; and
a button operatively coupled to the at least one LEDs such that the at least one LED is configured to illuminate upon depression of the button;
wherein the at least one LED comprises a plurality of LEDs, wherein each LED is illuminated at a first color during a first time period and a second color other than the first color during a second time period after the first time period.

13. The apparatus of claim 12, wherein the at least one LED is configured to illuminate in one of a static mode or a flashing mode upon a first depression of the button and wherein the at least one LED is configured to illuminate in another of the static mode or the flashing mode upon a second depression of the button.

14. An apparatus comprising:
a piece of fabric;
a slot formed in the piece of fabric;
at least one light emitting diode (LED) positioned within the slot;
a motion sensor configured to measure a motion parameter of the piece of fabric and operatively coupled to the at least one LED such that the at least one LED is configured to illuminate upon the motion parameter exceeding a motion threshold;
a switch with a first side connected to the at least one LED and a second side connected to a power source, wherein the switch has an off position to disconnect the at least one LED from the power source and an on position to connect the at least one LED to the power source; and
a controller configured to receive the motion parameter from the motion sensor and to compare the motion parameter with the motion threshold, wherein the controller is configured to transmit a signal to the switch to turn the switch to the on position upon a determination that the motion parameter exceeds the motion threshold.

15. An apparatus comprising:
a piece of fabric;
a slot formed in the piece of fabric;
at least one light emitting diode (LED) positioned within the slot; and
a motion sensor configured to measure a motion parameter of the piece of fabric and operatively coupled to the at least one LED such that the at least one LED is configured to illuminate upon the motion parameter exceeding a motion threshold;
wherein the at least one LED is configured to illuminate in one of a static mode or a flashing mode upon the motion parameter exceeding a first motion threshold and wherein the at least one LED is configured to illuminate in another of the static mode or the flashing mode upon the motion parameter exceeding a second motion threshold greater than the first motion threshold.

16. The apparatus of claim 15, wherein the motion sensor is an accelerometer to measure an acceleration of the piece of fabric and wherein the at least one LED is configured to illuminate upon the acceleration exceeding an acceleration threshold.

17. The apparatus of claim 15, wherein the slot extends continuously along the perimeter of at least two continuous sides of the piece of fabric and wherein the at least one LED comprises a plurality of LEDs that extend within the slot along the at least two continuous sides of the piece of fabric.

18. The apparatus of claim 15, further comprising:
a power source connected to the at least one LED; and
a controller configured to receive the motion parameter from the motion sensor and to compare the motion parameter with the motion threshold;
wherein the controller is configured to transmit a signal to the power source to illuminate the at least LED upon a determination that the motion parameter exceeds the motion threshold.

\* \* \* \* \*